United States Patent
Wang et al.

(10) Patent No.: US 6,545,782 B1
(45) Date of Patent: Apr. 8, 2003

(54) ASSYMMETRIC WAVELENGTH SLICING BASED DENSE WAVELENGTH DIVISION MULTIPLEXING

(76) Inventors: Hongchuan Wang, 44012 Beretta Dr., Fremont, CA (US) 94539; Mei Yan, 10530 Mira Vista Ave., Cupertino, CA (US) 95014

( * ) Notice: Subject to any disclaimer, the term of this patent is extended or adjusted under 35 U.S.C. 154(b) by 0 days.

(21) Appl. No.: 09/573,330

(22) Filed: May 18, 2000

(51) Int. Cl.$^7$ .............................................. H04J 14/02
(52) U.S. Cl. ........................ 359/124; 359/130; 359/127
(58) Field of Search ................................ 359/124, 130, 359/127; 385/24

(56) References Cited

U.S. PATENT DOCUMENTS

| | | | | |
|---|---|---|---|---|
| 6,115,155 A | * | 9/2000 | Liu et al. ..................... | 359/124 |
| 6,163,393 A | * | 12/2000 | Wu et al. ..................... | 359/127 |
| 6,208,444 B1 | * | 3/2001 | Wong et al. ................. | 359/127 |

* cited by examiner

Primary Examiner—Kinfe-Michael Negash
(74) Attorney, Agent, or Firm—Bo-In Lin

(57) ABSTRACT

The present invention discloses an improved wavelength slicing technique for demultiplexing a composite optical signal. The technique applies a method for demultiplexing the composite optical signal for transmitting data signals over a plurality of data channels of different wavelengths represented by $\lambda_1, \lambda_2, \lambda_3, \lambda_4, \ldots \lambda_n$ where n is a positive integer. The method includes a step a) of receiving the composite optical signal into an asymmetric wavelength slicing device through a device input port. And step b) of slicing the composite signal and extracting a first composite optical signal comprising data signals transmitted in a first set of data channels $\lambda_1, \lambda_a, \lambda_b, \lambda_c, \ldots \lambda_{n-1}$ through a first output port. And, extracting a second composite optical signal comprising data signals transmitted in a second set of data channels $\lambda_2, \lambda_d, \lambda_e, \lambda_f \ldots \lambda_n$ through a second output port wherein the second set of data channels is complimentary and asymmetric to the first set of data channels.

9 Claims, 4 Drawing Sheets

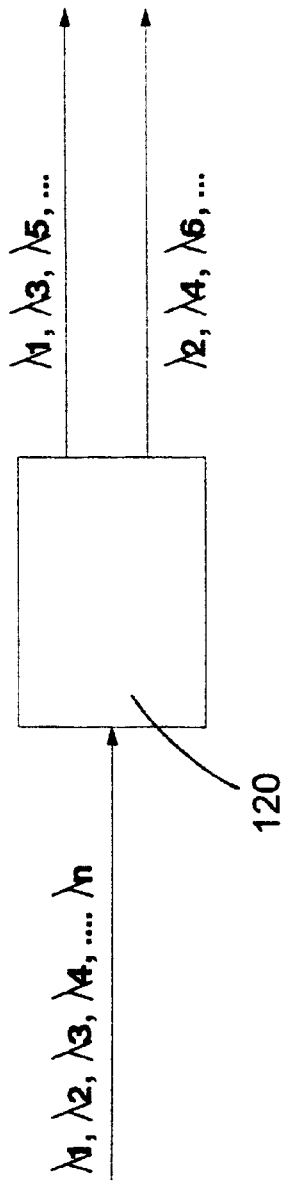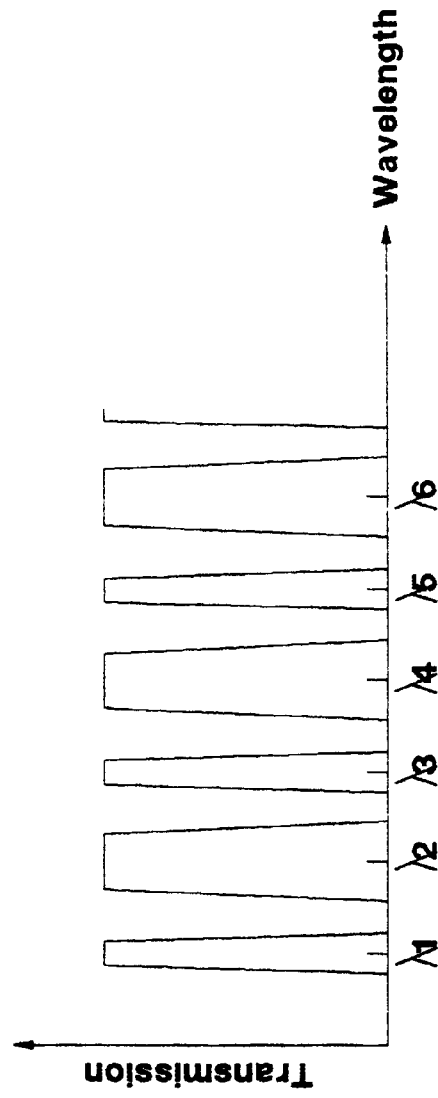

ASSYMMETRIC WAVELENGTH SLICING BASED DENSE WAVELENGTH DIVISION MULTIPLEXING

FIELD OF THE INVENTION

This invention relates generally to a method and system for demultiplexing wavelengths used in optical fiber technology. More particularly, this invention relates to a method and system for dense wavelength division multiplexing (DWDM) based on a new and improved technique of asymmetric wavelength slicing to flexibly configure a demultiplexing system more suitable for DWDM applications.

BACKGROUND OF THE INVENTION

The dense wavelength division multiplexing (DWDM) technology has been broadly employed to increase transmission capacity of existing fiber optic transmission systems. In the DWDM technology, optical signals generated with dense-spaced wavelengths from different sources are first combined into a single optical output. Then the single optical output is transmitted over a single optical fiber. Finally the single optical output is separated and de-multiplexed into individual optical signals having the same dense-spaced wavelengths, which are directed toward different destinations. The more narrow the spacing in wavelength between different optical signals, the greater transmission capacity the existing fiber optical transmission systems.

In the DWDM technology, the DWDM devices are needed to combine or separate optical signals having dense-spaced wavelengths. Several technologies, including the wavelength slicing, are currently being employed for providing the DWDM function. With rapid increasing demand for transmission capacity and thus decreasing wavelength spacing, the wavelength slicing technology is now becoming more and more popular for those of ordinary skill in the art to carry out the task of demultiplexing wavelengths.

FIG. 1 shows the current wavelength slicing based DWDM device as that disclosed in U.S. Pat. No. 6,040,932 entitled "Method and Circuit for Demultiplexing an Optical Signal" (issued on Mar. 21, 2000), the disclosure of U.S. Pat. No. 6,040,932 is hereby incorporated in this Application by reference. Duck et al. disclose in U.S. Pat. No. 6,040,932, the technique for the current wavelength slicing based DWDM with the incoming composite optical signals having dense-spaced wavelength channels. The composite optical signals are separated by an optical device comprising an etalon into two symmetrically complementary sets of composite output signals having wavelength spacing which is twice as that of incoming optical signals. Note that while all even wavelength channels are sliced into a set of output signals, all odd wavelength channels are sliced into the other output signals, and all channels have a equal bandwidth. Specifically, Ducks et al. implement a periodic multi-cavity Fabry-Perot etalon having a free spectral range of "2d" to couple to a circulator for launching an input beam. The first of the two composite optical signals carrying channels 1, 3, 5, . . . , n, is reflected from the input port of the etalon and the second of the two optical signals carrying channels 2, 4, 6, . . . , n−1 is transmitted through the etalon. The method is commonly referred to as symmetric optical slicing because of the symmetric characteristic in terms of wavelength and bandwidth. Many stages of symmetric optical slicers can be cascaded together to provide the DWDM to totally separate all wavelengths. Since current symmetric wavelength slicing based DWDM technology provides the symmetric wavelength and bandwidth characteristics, to completely demultiplexing the DWDM signals, slicers with different spectral ranges have to be used. For example, to demultiplex 0.8 nm (100 GHz) spaced signals, a slicer with a spectral range of 0.8 nm has to be used first to slice the signals to 200 GHz spacing. And, then a slicer with a spectral range of 1.6 nm (200 GHz) has to be used, and so on until the signals are completely demultiplexed. Another disadvantage of the conventional symmetric slicing is due to the fact that the bandwidth for each channel in both sliced arms is the same, therefore, the maximum bit-rate in each channel is the same, which limits the flexibility of the system.

Therefore, a need exists in the art of optical signal transmission with DWDM technique by implementing the optical channel slicing technology to overcome the difficulties discussed above. Specifically, a design to provide the wavelength slicing based DWDM which simplifies the system, and provides more flexibility is required.

SUMMARY OF THE PRESENT INVENTION

It is therefore an object of the present invention to provide an improved method and configuration for carrying out an asymmetric wave channel slicing such that the DWDM technology can be simplified without being limited by the difficulties of the symmetric wave-channel slicing technology. With a greater degree of freedom to design the system for wavelength channel separation by asymmetric channel slicing, aforementioned difficulties and limitations in the pending application can be overcome.

Another object of this invention is to flexibly design the asymmetric wavelength channel slicing device such that the wavelength spacing between adjacent channels can be flexibly adjusted to three, four, or five times of a very dense channel separation. The same asymmetric slicing devices can be cascaded to progressively separate the composite signals into individual optical signal transmitted in each of these wavelength channels.

Another object of this invention is to flexibly design the asymmetric wavelength channel slicing device such that the bandwidth of channels in one arm is different from that of the other to allow different maximum bit-rate to be transmitted in different wavelengths.

Briefly, in a preferred embodiment, the present invention discloses an improved wavelength slicing technique for demultiplexing a composite optical signal. The technique applies a method for demultiplexing the composite optical signal for transmitting data signals over a plurality of data channels of different wavelengths represented by $\lambda_1, \lambda_2, \lambda_3, \lambda_4, \ldots \lambda_n$ where n is a positive integer. The method includes a step a) of receiving the composite optical signal into an asymmetric wavelength-slicing device through a device-input port And step b) of slicing the composite signal and extracting a first composite optical signal comprising data signals transmitted in a first set of data channels $\lambda_1, \lambda_a, \lambda_b, \lambda_c, \ldots \lambda_{n-1}$ through a first output port. And, extracting a second composite optical signal comprising data signals transmitted in a second set of data channels $\lambda_2, \lambda_d, \lambda_e, \lambda_f, \ldots \lambda_n$ through a second output port wherein the second set of data channels is complimentary and asymmetric to the first set of data channels.

In another preferred embodiment, the present invention discloses an improved wavelength slicing technique for demultiplexing a composite optical signal. The technique applies a method for demultiplexing the composite optical signal for transmitting data signals over a plurality of data channels of different wavelengths represented by $\lambda_1, \lambda_2, \lambda_3, \lambda_4, \ldots \lambda_n$ where n is a positive integer. The method includes a step a) of receiving the composite optical signal into an asymmetric wavelength-slicing device through a device-input port And step b) of slicing the composite signal and extracting a first composite optical signal comprising data signals transmitted in a first set of data channels $\lambda_1, \lambda_3, \lambda_5, \lambda_7, \ldots \lambda_{n-1}$ through a first output port. And, extracting a second composite optical signal comprising data signals transmitted in a second set of data channels $\lambda_2, \lambda_4, \lambda_6, \lambda_8, \ldots \lambda_n$ through a second output port wherein the second set of data channels is complimentary and having different pass bandwidth than the first set of data channels.

These and other objects and advantages of the present invention will no doubt become obvious to those of ordinary skill in the art after having read the following detailed description of the preferred embodiment which is illustrated in the various drawing figures.

BRIEF DESCRIPTION OF THE DRAWINGS

FIGS. 3A and 3B are another functional block diagrams showing system configuration and method of operation using new and improved asymmetrical wavelength slicing devices of this invention.

DETAILED DESCRIPTION OF THE PREFERRED EMBODIMENT

The present invention discloses an asymmetric wavelength slicing system by separating the composite optical signals transmitted over dense wavelength channels into asymmetric channel distributions. Greater degrees of flexibility are achieved without being limited by a symmetric channel distribution requirement as that commonly implemented in the conventional DWDM techniques.

Figure 1:
FIG. 1 is a functional block diagram showing the operation principle of conventional symmetrical wavelength slicing device.
Figure 2A:
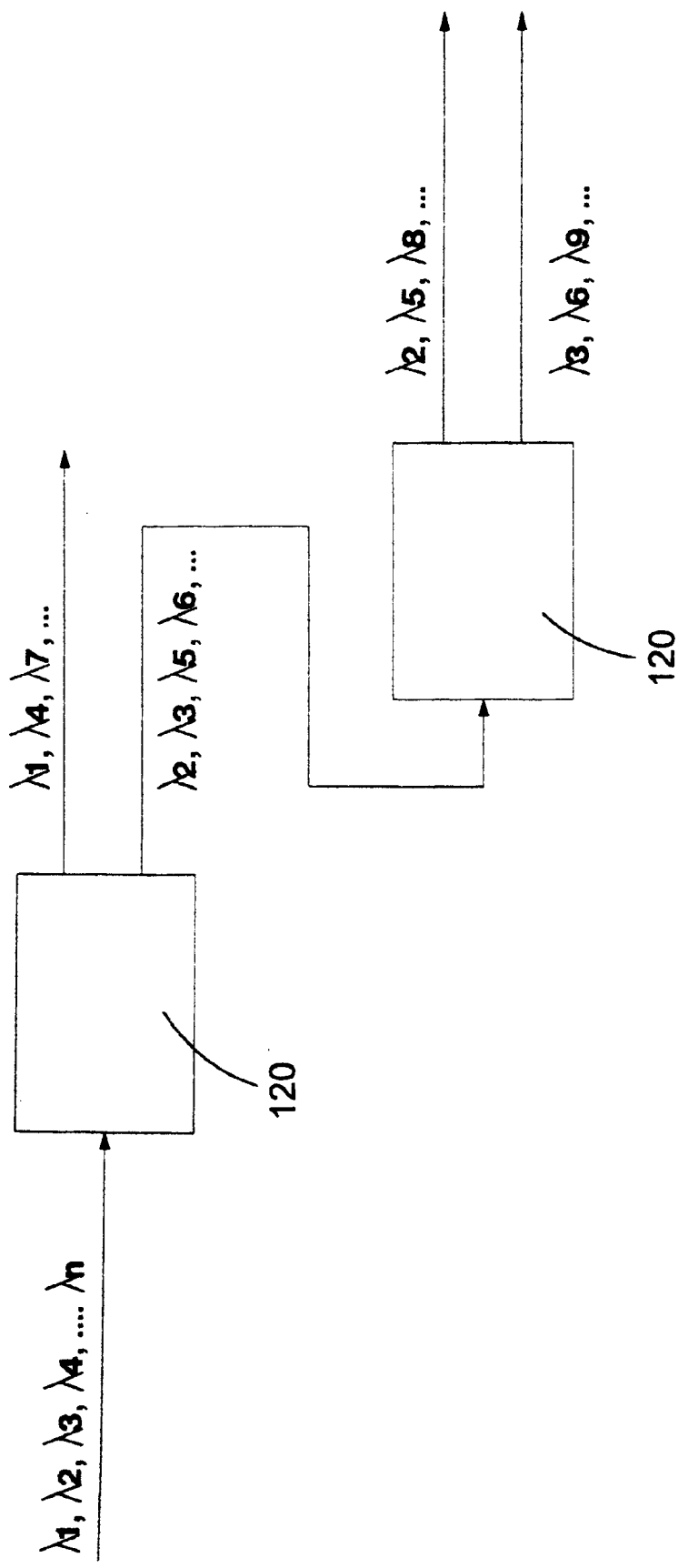
FIGS. 2A and 2B are functional block diagrams showing system configuration and method of operation using new and improved asymmetrical wavelength slicing devices of this invention.
Figure 2B:
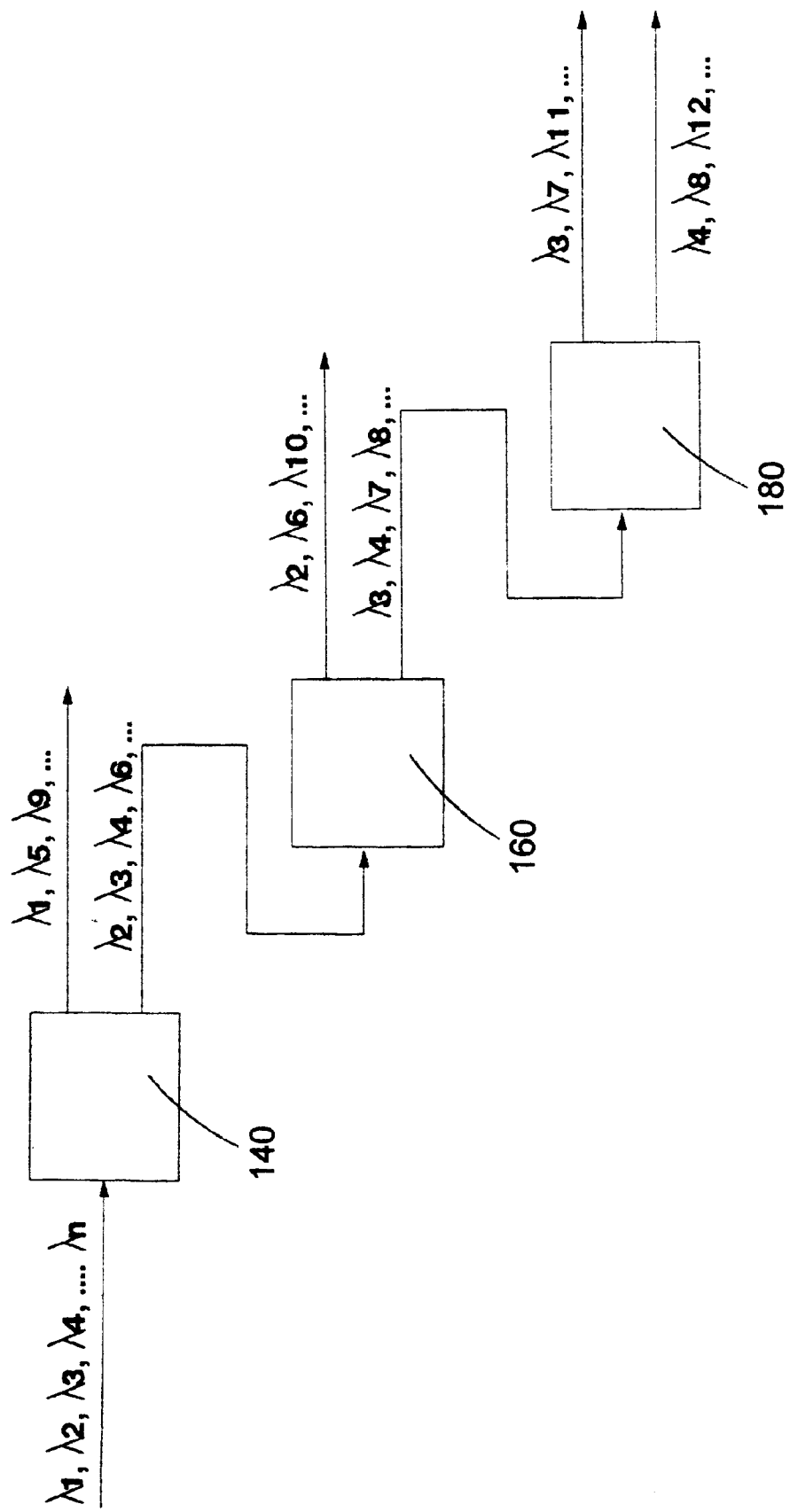

Referring to FIGS. 2A and 2B for the asymmetric wavelength slicing system of this invention. The incoming optical signals transmitted with dense wavelength spaced channels represent by $\lambda_1, \lambda_2, \lambda_3, \lambda_4, \ldots \lambda_n$ are received by an asymmetric wavelength slicing device 120 for dividing the composite incoming signals represented by $\lambda_1, \lambda_2, \lambda_3, \lambda_4, \ldots \lambda_n$ into asymmetric channel distributions. Specifically, in FIG. 2A, the asymmetric wavelength slicing device 120 separate the incoming composite signals into a first composite signal for transmitting optical signals through wavelength channels $\lambda_1, \lambda_4, \lambda_7, \lambda_{10}, \ldots \lambda_{1+3k} \ldots \lambda_{n-1}$. In the meantime, the wavelength slicing device 120 generates a complimentary composite signal for transmitting optical signals through wavelength channels $\lambda_2, \lambda_5, \lambda_8, \lambda_{11}, \ldots \lambda_{2+3k} \ldots \lambda_n$. The same asymmetric wavelength-slicing devices 120 thus can be cascaded to further demultiplexing the signals. FIG. 2B shows another preferred embodiment of the asymmetric wavelength slicing system for demultiplexing the composite signals employed for optical signal transmission using dense-spaced wavelength channels. Specifically, the first wavelength slicing device 140 divides the composite signals $\lambda_1, \lambda_2, \lambda_3, \lambda_4, \ldots \lambda_n$ into two output composite signals transmitted in wavelength channels $\lambda_1, \lambda_5, \lambda_9, \lambda_{13}, \ldots \lambda_{n-1}$ and a second composite signal transmitted in wavelength channels $\lambda_2, \lambda_3, \lambda_4, \lambda_6, \lambda_7, \lambda_8, \ldots \lambda_n$. A second asymmetric wavelength slicing device 160 is cascaded to the first wavelength slicing device 140 to further divide the second composite signal into two separate signals transmitted in wavelength channel $\lambda_2, \lambda_6, \lambda_{10}, \ldots \lambda_{2+4k+}, \ldots$, and second composite signal transmitted in wavelength channel $\lambda_3, \lambda_4, \lambda_7, \lambda_8 \ldots \lambda_{3K}, \lambda_{3K+1}, \ldots \lambda_n$. Then, a third wavelength slicing device 180 is cascaded to the second wavelength slicing device 160 to further divide the wavelength channels into $\lambda_3, \lambda_7, \lambda_{11}, \ldots \lambda_{3+4k}$, and $\lambda_4, \lambda_8, \lambda_{12}, \ldots \lambda_{4k+}, \ldots \lambda_n$.

Referring to FIGS. 3A and 3B for another asymmetric wavelength slicing system of this invention. The incoming optical signals transmitted with dense wavelength spaced channels represent by $\lambda_1, \lambda_2, \lambda_3, \lambda_4, \ldots \lambda_n$ are received by an asymmetric wavelength slicing device 120 for dividing the composite incoming signals represented by $\lambda_1, \lambda_2, \lambda_3, \lambda_4, \ldots \lambda_n$ into a symmetric channel distributions but asymmetric pass bandwidth. Specifically, in FIG. 3A, the asymmetric wavelength slicing device 120 separate the incoming composite signals into a first composite signal for transmitting optical signals through wavelength channels $\lambda_1, \lambda_3, \lambda_5, \lambda_7, \ldots \lambda_{n-1}$. In the meantime, the wavelength slicing device 120 generates a complimentary composite signal for transmitting optical signals through wavelength channels $\lambda_2, \lambda_4, \lambda_6, \lambda_8, \ldots \lambda_n$. In this particular embodiment, the channel distribution is the same as the conventional symmetric slicing, however, since the pass bandwidth is different in the two transmitted signals, this invention provides more flexibility for transmitting different bit-rate in different wavelengths.

Many stages of asymmetric optical slicers can be cascaded together to provide the DWDM to totally separate all wavelengths. Compared to the conventional symmetric optical wavelength slicing systems, the same asymmetric optical slicing devices as shown can be used to demultiplexing the optical signals thus reduce the complexity of the DWDM technology. Therefore, the above-discussed difficulties can be solved.

The techniques of asymmetric wavelength slicing implemented in slicing devices 120, 140 and 180 can be accomplished by incorporating many of the currently available technologies such as the use of etalon or polarization filters. In addition, various technologies are also disclosed in U.S. Pat. Nos. 5,119,45, 5,444,802, 5,731,889, 5,754,718. Different configurations of etalon devices with variations in spacer layers, and index medium, coupled with diffraction gratings along with temperature control methods are available for providing the asymmetrical wavelength slicing as described above. These patents are hereby incorporated as references for this Application.

According to FIGS. 2A and 2B, this invention discloses an improved wavelength slicing technique for demultiplexing a composite optical signal. The technique applies a method for demultiplexing the composite optical signal for transmitting data signals over a plurality of data channels of different wavelengths represented by $\lambda_1, \lambda_2, \lambda_3, \lambda_4, \ldots \lambda_n$ where n is a positive integer. The method includes a step a) of receiving the composite optical signal into an asymmetric wavelength slicing device 120 through a device input port. And step b) of slicing the composite signal and extracting a first composite optical signal comprising data signals transmitted in a first set of data channels $\lambda_1, \lambda_a, \lambda_b, \lambda_c, \ldots \lambda_{n-1}$ through a first output port. And, extracting a second composite optical signal comprising data signals transmitted in a second set of data channels $\lambda_2, \lambda_d, \lambda_e, \lambda_f, \ldots \lambda_n$ through a second output port wherein the second set of data channels is complimentary and asymmetric to the first set of data channels. In a specific embodiment, shown in FIG. 2A, the step b) of slicing the composite signal into the first composite optical signal and the second composite signal includes a step b1) of extracting the first composite optical signal comprising data signals transmitted in the first set of data channels $\lambda_1, \lambda_4, \lambda_7, \lambda_{10}, \ldots \lambda_{n-1}$ through a first output port And extracting a second composite optical signal comprising data signals transmitted in the second set of data channels $\lambda_2, \lambda_3, \lambda_5, \lambda_7, \ldots \lambda_n$ through a second output port whereby the second set of data channels is complimentary and asymmetric to the first set of data channels.

In another preferred embodiment, as that shown in FIG. 2A, the method for demultiplexing the composite optical signal further includes a step of c) receiving the second composite optical signal into a second asymmetric wavelength slicing device 140 through a second device input port. And, d) slicing the second composite signal and extracting a third composite optical signal comprising data signals transmitted in a third set of data channels $\lambda_2, \lambda_5, \lambda_8, \lambda_{11}, \ldots \lambda_{n-2}$ through a third output port on the second asymmetric wavelength slicing device. And extracting a fourth composite optical signal comprising data signals transmitted in a fourth set of data channels $\lambda_3, \lambda_6, \lambda_9, \lambda_{12}, \ldots \lambda_n$ through a fourth output port on the second asymmetric wavelength slicing device 140. The fourth set of data channels is complimentary and asymmetric to the third set of data channels.

In another preferred embodiment, as that shown in FIG. 2B, the step b) of slicing the composite signal into the first composite optical signal and the second composite signal includes a step b2). That step is to extract the first composite optical signal comprising data signals transmitted in the first set of data channels $\lambda_1, \lambda_5, \lambda_9, \lambda_{13}, \ldots \lambda_{n-1}$ through a first output port. And also to extract a second composite optical signal comprising data signals transmitted in the second set of data channels $\lambda_2, \lambda_3, \lambda_4, \lambda_6, \lambda_7, \lambda_8, \ldots \lambda_n$ through a second output port whereby the second set of data channels is complimentary and asymmetric to the first set of data channels. In another preferred embodiment, the method further includes the following steps. Step c) of receiving the second composite optical signal into a second asymmetric wavelength slicing device 160 through a second device input port. And, step d) of slicing the second composite signal and extracting a third composite optical signal comprising data signals transmitted in a third set of data channels $\lambda_2, \lambda_6, \lambda_{10}, \lambda_{14}, \ldots \lambda_{n-2}$ through a third output port on the second asymmetric wavelength slicing device 160. And, extracting a fourth composite optical signal comprising data signals transmitted in a fourth set of data channels $\lambda_3, \lambda_4, \lambda_7, \lambda_8, \ldots \lambda_n$ through a fourth output port on the second asymmetric wavelength slicing device 160. The fourth set of data channels is complimentary and asymmetric to the third set of data channels. In another preferred embodiment, as shown in FIG. 2B, the method further includes the following steps. Step e) of receiving the fourth composite optical signal into a third asymmetric wavelength slicing device 180 through a third device input port Step f) of slicing the fourth composite signal and extracting a fifth composite optical signal comprising data signals transmitted in a fifth set of data channels $\lambda_3, \lambda_7, \lambda_{11}, \lambda_{15}, \ldots \lambda_{n-3}$ through a fifth output port on the third asymmetric wavelength slicing device 180. And, extracting a sixth composite optical signal comprising data signals transmitted in a sixth set of data channels $\lambda_4, \lambda_8, \lambda_{12}, \lambda_{16}, \ldots \lambda_n$ through a sixth output port on the third asymmetric wavelength slicing device 180. The sixth set of data channels is complimentary and asymmetric to the fifth set of data channels.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A method for asymmetrically demultiplexing a composite optical signal with different wavelengths represented by $\lambda_1, \lambda_2, \lambda_3, \lambda_4, \ldots \lambda_n$ where n is a positive integer and said wavelengths are equally spaced, comprising steps of
   a) receiving said composite optical signal into an asymmetric wavelength slicing device through a device input port; and
   b) asymmetrically slicing said composite signal and extracting a first composite optical signal comprising a first set of channels $\lambda_1, \lambda_a, \lambda_b, \lambda_c, \ldots \lambda_{n-1}$ through a first output port, and a second composite optical signal comprising a second set of channels $\lambda_2, \lambda_d, \lambda_e, \lambda_f \ldots \lambda_n$ through a second output port wherein said second set of data channels is complimentary to said first set of data channels and a first wavelength spacing $\Delta\lambda_1$ between channels of said first set of channels represented by spacing $\Delta\lambda_1=(\lambda_1-\lambda_a)$ between channels $\lambda_1$ and $\lambda_a$ is different from a second wavelength spacing $\Delta\lambda_2$ between channels of said second set of channels represented by a wavelength spacing $\Delta\lambda_2=(\lambda_2-\lambda_d)$ between channels $\lambda_2$ and $\lambda_d$.

2. The method for asymmetrically demultiplexing said composite optical signal of claim 1 wherein:
   said step b) of asymmetrically slicing said composite signal into said first composite optical signal and said second composite signal comprising a step b1) of extracting said first composite optical signal comprising said first set of channels $\lambda_1, \lambda_4, \lambda_7, \lambda_{10}, \ldots \lambda_{n-1}$ through a first output port with a first wavelength spacing $\Delta\lambda_1=(\lambda_1-\lambda_4)$ and a second composite optical signal comprising said second set of channels $\lambda_2, \lambda_3, \lambda_5, \lambda_6, \lambda_8, \lambda_9 \ldots \lambda_n$ through a second output port with a second wavelength spacing $\Delta\lambda_2=(\lambda_2-\lambda_3)$ whereby said first wavelength spacing $\Delta\lambda_1$ is different from said second wavelength spacing $\Delta\lambda_2$ and said second set of data channels is complimentary and asymmetric to said first set of data channels.

3. The method for asymmetrically demultiplexing said composite optical signal of claim 2 further comprising a step of:
   c) receiving said second composite optical signal into a second wavelength slicing device through a second device input port; and
   d) asymmetrically slicing said second composite signal and extracting a third composite optical signal comprising a third set of channels $\lambda_2, \lambda_5, \lambda_8, \lambda_{11}, \ldots \lambda_{n-2}$ through a third output port on said second wavelength slicing device, and a fourth composite optical signal comprising a fourth set of channels $\lambda_3, \lambda_6, \lambda_9, \lambda_{12}, \ldots \lambda_n$ through a fourth output port on said second wavelength slicing device, wherein said fourth set of data channels is complimentary and asymmetric to said third set of data channels.

4. The method for asymmetrically demultiplexing said composite optical signal of claim 1 wherein:

said step b) of asymmetrically slicing said composite signal into said first composite optical signal and said second composite optical signal comprising a step b2) of extracting said first composite optical signal comprising said first set of channels $\lambda_1, \lambda_5, \lambda_9, \lambda_{13}, \ldots \lambda_{n-1}$ through a first output port with a first wavelength spacing $\Delta\lambda_1=(\lambda_1-\lambda_5)$, and a second composite optical signal comprising said second set of channels $\lambda_2, \lambda_3, \lambda_4, \lambda_6, \lambda_7, \lambda_8, \ldots \lambda_n$ with a second wavelength spacing $\Delta\lambda_2=(\lambda_2-\lambda_3)$ through a second output port whereby said second set of data channels is complimentary and asymmetric to said first set of data channels.

5. The method for asymmetrically demultiplexing said composite optical signal of claim 4 further comprising a step of:

c) receiving said second composite optical signal into a second asymmetric wavelength slicing device through a second device input port; and d) asymmetrically slicing said second composite signal and extracting a third composite optical signal comprising a third set of channels $\lambda_2, \lambda_6, \lambda_{10}, \lambda_{14}, \ldots \lambda_{n-2}$ through a third output port on said second asymmetric wavelength slicing device with a third wavelength spacing $\Delta\lambda_3=(\lambda_2-\lambda_6)$, and a fourth composite optical signal comprising a fourth set of channels $\lambda_3, \lambda_4, \lambda_7, \lambda_8, \ldots \lambda_n$ through a fourth output port on said second asymmetric wavelength slicing device with a third wavelength spacing $\Delta\lambda_4=(\lambda_3-\lambda_4)$, wherein said fourth set of data channels is complimentary and asymmetric to said third set of data channels.

6. The method for asymmetrically demultiplexing said composite optical signal of claim 5 further comprising a step of:

e) receiving said fourth composite optical signal into a third wavelength slicing device through a third device input port; and f) asymmetrically slicing said fourth composite signal and extracting a fifth composite optical signal comprising a fifth set of channels $\lambda_3, \lambda_7, \lambda_{11}, \lambda_{15}, \ldots \lambda_{n-3}$ through a fifth output port on said third wavelength slicing device and a sixth composite optical signal comprising a sixth set of channels $\lambda_4, \lambda_8, \lambda_{12}, \lambda_{16}, \ldots \lambda_n$ through a sixth output port on said third wavelength slicing device wherein said sixth set of data channels is complimentary to said fifth set of data channels.

7. A method for asymmetrically demultiplexing a composite optical signal with different wavelengths represented by $\lambda(1), \lambda(2), \lambda(3), \ldots, \lambda(n)$ where n is a positive integer and the wavelengths are equally spaced with wavelength spacing $\Delta\lambda(0)=\lambda(2)-\lambda(1)$, comprising steps of a) receiving said composite optical signal into an asymmetric wavelength slicing device through a device input port; and b) asymmetrically slicing said composite signal and extracting a first composite optical signal comprising a first set of channels $\lambda(1), \lambda(1+j), \lambda(1+2j), \lambda(1+3j), \ldots, \lambda(n-1)$ where j is a positive integer and j is equal or greater than 3, through a first output port, and a second composite optical signal comprising a second set of channels $\lambda(2), \lambda(3), \lambda(4), \ldots, \lambda(j), \lambda(j+2), \lambda(j+3), \ldots, \lambda(2j), \lambda(2j+2), \ldots, \lambda(n)$, through a second output port wherein said second set of data channels is complimentary but having a different channel wavelength spacing from said first set of channels.

8. A asymmetric wavelength slicing device for asymmetrically demultiplexing a composite optical signal with different wavelengths represented by $\lambda(1), \lambda(2), \lambda(3), \ldots, \lambda(n)$, where n is a positive integer and the wavelengths are equally spaced, comprising:

two output ports for outputting said composite signal as a first composite optical signal comprising a first set of channels $\lambda(1), \lambda(1+j), \lambda(1+2j), \lambda(1+3j), \ldots, \lambda(n-1)$ where j is a positive integer and j is equal or greater than 3, and a second composite optical signal comprising a second set of channels $\lambda(2), \lambda(3), \lambda(4), \ldots \lambda(j), \lambda(j+2), \lambda(j+3), \ldots \lambda(2j), \lambda(2j+2), \ldots \lambda(n)$ through a second output port wherein said second set of data channels is complimentary to said first set of data channels.

9. A asymmetric wavelength slicing device for asymmetrically demultiplexing a composite optical signal with different wavelengths represented by $\lambda(1), \lambda(2), \lambda(3), \ldots, \lambda(n)$ where n is a positive integer and the wavelengths are equally spaced, comprising:

two output ports for outputting said composite signal as a first composite optical signal comprising a first set of channels $\lambda(k1)$, where $k1=1, k1(1), k1(2), k1(3), \ldots, k1(i), \ldots, k1(m1), n-1$, where m1, and k1(i), i=1, 2, ... m are positive integers, through a first output port, and a second composite optical signal comprising a second set of channels $\lambda(k2)$, where $k2=2, k2(1), k2(2), k1(3), \ldots, k2(i), \ldots k2(m2), n$, where m2, and k2(i), i=1, 2, ... m2 are positive integers, through a second output port wherein said second set of data channels is complimentary to said first set of data channels and a wavelength spacing between adjacent channels among channels of $\lambda(k1)$, where $k1=1, k1(1), k1(2), k1(3), \ldots, k1(i), \ldots k1(m1), n-1$ is different from a wavelength spacing between adjacent channels among channels of $\lambda(k2)$, where $k2=2, k2(1), k2(2), k1(3), \ldots, k2(i), \ldots k2(m2)$.

* * * * *